(12) United States Patent
Choi et al.

(10) Patent No.: US 11,568,665 B2
(45) Date of Patent: Jan. 31, 2023

(54) METHOD AND APPARATUS FOR RECOGNIZING ID CARD

(71) Applicant: KakaoBank Corp., Seongnam-si (KR)

(72) Inventors: Ho Yeol Choi, Seongnam-si (KR);
Hyeon Seung Kim, Seongnam-si (KR);
Eun Jin Song, Seongnam-si (KR);
Kyung Doo Moon, Seongnam-si (KR);
Jong Sun Yoo, Seongnam-si (KR);
Sung Hwan Cho, Seongnam-si (KR);
Yong Uk Kim, Seongnam-si (KR); Tae Wan Kim, Seongnam-si (KR); Tae Ki Ha, Seongnam-si (KR); Jung Ho Bae, Seongnam-si (KR)

(73) Assignee: KakaoBank Corp., Seongnam-si (KR)

( * ) Notice: Subject to any disclaimer, the term of this patent is extended or adjusted under 35 U.S.C. 154(b) by 0 days.

(21) Appl. No.: 17/641,570

(22) PCT Filed: Sep. 29, 2020

(86) PCT No.: PCT/KR2020/013370
§ 371 (c)(1),
(2) Date: Mar. 9, 2022

(87) PCT Pub. No.: WO2021/066541
PCT Pub. Date: Apr. 8, 2021

(65) Prior Publication Data
US 2022/0301333 A1  Sep. 22, 2022

(30) Foreign Application Priority Data

Oct. 1, 2019 (KR) .................. 10-2019-0121560

(51) Int. Cl.
*G06V 30/414* (2022.01)
*G06T 7/11* (2017.01)
(Continued)

(52) U.S. Cl.
CPC ......... *G06V 30/414* (2022.01); *G06N 3/0454* (2013.01); *G06T 7/11* (2017.01); *G06V 10/75* (2022.01)

(58) Field of Classification Search
CPC .... G06N 3/0454; G06V 10/75; G06V 30/414; G06T 7/11; G06T 7/12
See application file for complete search history.

(56) References Cited

U.S. PATENT DOCUMENTS 9,946,930 B2 * 4/2018 Matos ................. G06K 9/00
10,140,597 B2 * 11/2018 Benton ............... G06V 30/413
(Continued)

FOREIGN PATENT DOCUMENTS

KR   10-2003-0052126 A    6/2003
KR   10-2015-0107186 A    9/2015
(Continued)

OTHER PUBLICATIONS

International Search Report dated Jan. 12, 2021, issued in counterpart International Application No. PCT/KR2020/013370, with English Translation. (7 pages).
(Continued)

*Primary Examiner* — Mia M Thomas
(74) *Attorney, Agent, or Firm* — WHDA, LLP

(57) ABSTRACT

A method for recognizing an identification (ID) card of a user terminal using deep learning includes extracting an outline region of the ID card included in an input image using a first neural network model, modifying the ID card image of the image to a reference form using at least a partial value of the extracted outline region, and determining whether the modified ID card image is valid and recognizing text information in the valid ID card image. A recognition (Continued)

rate of the ID card may be increased by modifying an ID card image into a reference form using a trained neural network model.

14 Claims, 7 Drawing Sheets

(51) Int. Cl.
*G06V 10/75* (2022.01)
*G06N 3/04* (2006.01)

(56) References Cited

U.S. PATENT DOCUMENTS

| | | | |
|---|---|---|---|
| 10,586,238 B2* | 3/2020 | Morey | G06Q 30/016 |
| 10,595,753 B1* | 3/2020 | Delgado | A61B 5/349 |
| 10,853,680 B2* | 12/2020 | Fuchigami | G06T 3/4053 |
| 10,909,413 B2* | 2/2021 | Uno | G06K 9/6201 |
| 2007/0205262 A1* | 9/2007 | Bates | G06Q 40/02 235/383 |
| 2014/0270329 A1* | 9/2014 | Rowley | G06Q 20/102 382/100 |
| 2015/0117781 A1* | 4/2015 | Li | G06Q 20/351 382/182 |
| 2018/0239983 A1* | 8/2018 | Rowley | G06K 9/6267 |
| 2018/0350180 A1* | 12/2018 | Onischuk | G07C 13/00 |
| 2019/0172022 A1* | 6/2019 | Benton | G06Q 20/4016 |
| 2019/0333070 A1* | 10/2019 | Lochan Dass | G06Q 20/3829 |
| 2020/0265384 A1* | 8/2020 | Bleazard | G06F 16/212 |
| 2021/0135862 A1* | 5/2021 | Morales | H04L 9/50 |

FOREIGN PATENT DOCUMENTS

| | | | | |
|---|---|---|---|---|
| KR | 10-2017-0047804 A | 5/2017 | | |
| KR | 10-2017-0048758 A | 5/2017 | | |
| KR | 20-0483242 Y1 | 5/2017 | | |
| KR | 10-2018-0092455 A | 8/2018 | | |
| KR | 10-2019-0106853 A | 9/2019 | | |
| KR | 10-2142347 B1 | 8/2020 | | |
| WO | WO-2017069385 A1 * | 4/2017 | | G06K 9/32 |

OTHER PUBLICATIONS

Decision to Grant a Patent dated Aug. 1, 2020, issued in counterpart of Korean Patent Application No. 10-2019-0121560, with English Translation (5 pages).

Notification of Reason for Refusal dated Jul. 10, 2020, issued in counterpart of Korean Patent Application No. 10-2019-0121560, with English Translation (8 pages).

* cited by examiner

METHOD AND APPARATUS FOR RECOGNIZING ID CARD

TECHNICAL FIELD

The present disclosure relates to an identification (ID) card recognizing method and apparatus, and more particularly, to a method and apparatus for recognizing an ID card through a deep learning-based ID card recognition model.

BACKGROUND ART

In general, an ID recognizing device images an ID card (resident registration card, driver's license, employee card, etc.) presented by a user to acquire image information and searches the acquired image information for a character region.

Subsequently, the ID recognizing device extracts a character present in the searched character region and automatically recognizes the ID card through a process of converting the extracted character to be readable by a computer.

There are various ways of recognizing characters in an ID, and an optical character recognition (OCR) technology is typically used. The OCR technology is a technology that analyzes an image acquired by imaging an ID card to search for a character region and recognizes a character included in the searched character region based on a pattern.

That is, a character in an image of an ID card captured through a camera is automatically read by applying the OCR technology, which is an existing character recognition method, thereby omitting a user's character input operation.

However, since the related art method is not specially developed for ID cards, the related art method is vulnerable to an influence of a background for image capture and an external environment according to a pattern, reflection, etc. for preventing forgery of ID cards. For example, text in an ID card may not be recognized, it may take a long time to recognize text, and an area of an ID card itself may not be recognized due to shading by a hand holding the ID card or a shadow, and thus, there is a need for a recognition method to be considered.

In addition, the existing image processing-based character recognition technology takes a lot of time to process and has disadvantages in that it is difficult to actively cope with various external environmental changes.

Recently, with the development of artificial intelligence (AI) technology, AI technologies have been applied in various fields, and methods for detecting and tracking objects in images through a neural network model have been developed instead of the existing image processing method. The neural network model used for artificial intelligence may detect objects in an input image faster and more accurately than general image processing through learning.

Therefore, it is necessary to solve the disadvantages of the existing ID card recognition method based on the image processing technology, such as slow recognition speed, shading by hand, and a background for image capture by applying the AI technology to the ID card image.

DISCLOSURE

Technical Problem

An object of the present disclosure is to propose a method for recognizing an ID card of a user terminal through an ID card recognition model.

Technical Solution

According to an exemplary embodiment of the present disclosure, a method for recognizing an identification (ID) card of a user terminal using deep learning includes: extracting an outline region of the ID card included in an input image using a first neural network model; modifying an ID card image of the image to a reference form using at least a partial value of the extracted outline region; and determining whether the modified ID card image is valid and recognizing text information in the valid ID card image.

The method may further include: determining whether the ID card exists in the input image using a second neural network model, wherein the extracting the outline region of the ID card comprises extracting the outline region when the ID card exists.

The method may further include: enhancing an outer pixel value of the text information in the modified ID card image against periphery information, wherein the recognizing the text information comprises recognizing the text information in the ID card image using the enhanced pixel value.

The method may further include: wherein the recognizing the text information comprises determining whether there is a recognition inhibitory factor in the modified ID card image using a third neural network model in the modified ID card image, and wherein the extracting the outline region of the ID card comprises extracting an outline region of the ID card in a re-input image may be re-extracted according to the presence of the ID card.

The method may further include: wherein the recognizing the text information comprises recognizing the text information in the ID card image using a fourth neural network model.

The first neural network model may be configured to label at least one corner position of the ID card image, and perform learning through data generated by converting the labeled ID card image according to a predetermined condition The third neural network model may be configured to perform learning by collecting the ID card image including the recognition inhibitory factor as learning data.

The method may further include: displaying a guide interface for guiding an image capture region of the ID card together with the input image, wherein the displaying the guide interface comprises changing a display aspect of the guide interface according to a result of determining whether the ID card image modified into the reference form is valid.

According to another exemplary embodiment of the present disclosure, an apparatus for recognizing an identification (ID) card based on deep learning includes: a memory storing a plurality of program modules; and a processor executing the plurality of program modules stored in the memory, wherein the plurality of program modules each include: an outline extracting unit configured to extract an outline region of the ID card included in an input image using a first neural network model; an image modifying unit configured to modify an ID card image of the image to a reference form using at least a partial value of the extracted outline region; an inhibitory factor determining unit configured to determine whether the modified ID card image is valid; and a text recognizing unit configured to recognize text information in the valid ID card image.

The apparatus may further include: an ID card determining unit configured to determine whether the ID card exists in the input image using a second neural network model, wherein the outline extracting unit is further configured to extract the outline region when the ID card exists.

The apparatus may further include: a text enhancing unit configured to enhance an outer pixel value of the text information in the modified ID card image against periphery information, wherein the ID card determining unit is further configured to recognize text information in the ID card image using the enhanced pixel value.

The inhibitory factor determining unit may be configured to determine whether there is a recognition inhibitory factor in the modified ID card image using a third neural network model in the modified ID card image, and wherein the outline extracting unit may be configured to re-extract an outline region of the ID card in a re-input image according to the presence of the ID card.

The text recognizing unit may be configured to recognize text information in the ID card image using a fourth neural network model.

The first neural network model may be configured to label at least one corner position of the ID card image, and perform learning through data generated by converting the labeled ID card image according to a predetermined condition.

The third neural network model may be configured to perform learning by collecting the ID card image including the recognition inhibitory factor as learning data.

According to another exemplary embodiment of the present disclosure, a method for recognizing an identification (ID) card of a user terminal using deep learning includes: receiving an image through the user terminal; displaying a guide interface guiding an image capture region of the ID card together with the input image, as a first process of the user terminal; modifying an ID card image of the image into a reference form using at least a partial value of an outline region of the ID card and determining whether the modified ID card image is valid, as a second process performed in parallel with the first process, wherein, the displaying the guide interface comprises changing a display aspect of the guide interface according to a result of determining whether the ID card image modified into the reference form is valid.

According to another exemplary embodiment of the present disclosure, a method of providing an identification (ID) card recognition service based on deep learning performed in a service providing server includes: releasing an application including an ID card recognition model performing at least one convolution operation so that a user terminal uses the application for an image captured by the user terminal; receiving a result of checking authenticity of an ID card through a certification agency server from the user terminal according to an ID card recognition result of the released ID card recognition model; and providing a user request service according to the result of checking authenticity of the ID card, wherein the ID card recognition model includes a first neural network model extracting an outline region of the ID card included in the image.

Advantageous Effects

According to the present disclosure, there is an effect of increasing a text information recognition rate of an ID card by modifying an ID card image into a reference form using a trained neural network model.

In addition, the present disclosure has an effect of more accurately extracting an outline region, which is the basis of ID card recognition, through learning data considering various image capture environments.

In addition, the present disclosure has the effect of more accurately and quickly determining the validity of an ID card image captured in real time by learning various ID card recognition inhibitory factors.

BEST MODE

The following description illustrates only a principle of the present disclosure. Therefore, those skilled in the art may invent various devices that implement the principle of the present disclosure and are included in the spirit and scope of the present disclosure although they are not clearly described or shown in the present specification. In addition, it is to be understood that all conditional terms and exemplary embodiments listed in the present specification are obviously intended only to allow those skilled in the art to understand a concept of the present disclosure in principle, and the present disclosure is not limited to the exemplary embodiments and states particularly listed as described above.

The above-mentioned objects, features, and advantages will become more obvious from the following detailed description provided in relation to the accompanying drawings. Therefore, those skilled in the art to which the present disclosure pertains may easily practice a technical idea of the present disclosure.

Further, in describing the present disclosure, in the case in which it is determined that a detailed description of a known technology associated with the present disclosure may unnecessarily make the gist of the present disclosure unclear, it will be omitted. Hereinafter, exemplary embodiments of the present disclosure will be described in detail with reference to the accompanying drawings.

Figure 1:
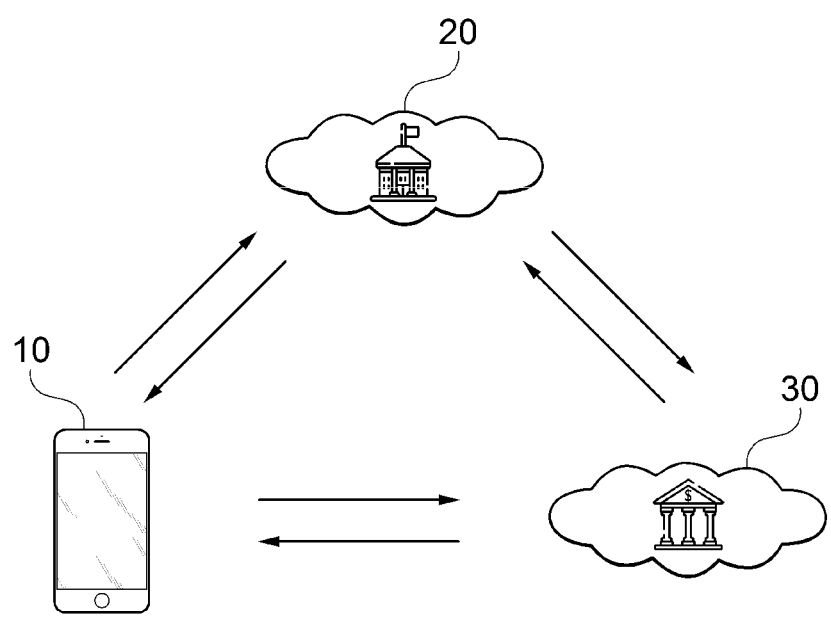
FIG. 1 is an exemplary view showing an identification (ID) card recognition system according to an embodiment of the present disclosure.

FIG. 1 is an exemplary diagram illustrating an identification (ID) card recognition system 1000 according to an embodiment of the present disclosure.

Referring to FIG. 1, the ID card recognition system 1000 may include a user terminal 10, a certification agency server 20, and a service providing server 30.

The user terminal 10 of the ID card recognition system 1000 may recognize an ID card and transmit the recognized ID card information to the certification agency server 20. Here, the user terminal 10 is an electronic device of a user that recognizes an ID card, and includes a camera module for recognizing an ID card and a communication module for communication with the certification agency server 20 and the service providing server 30. For example, the user terminal 10 may be a smartphone, a tablet, a PDA, or the like. Also, in some cases, the user terminal 10 may be a notebook computer, a desktop PC, or the like.

The certification agency server 20 may determine whether the received ID card information is valid and subsequently transmit a determination result to the service providing server 30 or the user terminal 10. Here, the certification agency server 20 is a server capable of receiving ID card information and determining whether the ID card information is adequate, and may be a server of a government office that stores and manages ID card comparison information.

And, when the ID card information is adequate, the service providing server 30 may receive the corresponding ID card information from the user terminal 10 or the certification agency server 20 and perform additional tasks using the ID card. Here, the service providing server 30 may be a server of an institution requiring adequate ID card information. For example, the service providing server 30 may be a server of a financial institution such as a bank or a securities company.

The user may download and install an application released from the service providing server 30 in a mobile environment (e.g., Android, iOS, etc.) using the user terminal 10 (e.g., a smartphone), and use services such as Internet banking, etc.

In addition, if ID card checking is required during financial services, an ID card may be imaged through the camera module of the user terminal 10 to request the processing of financial services. In general, an identification procedure includes procedures such as mobile phone identification, ID card authenticity checking, and third party transfer confirmation. The present disclosure relates to ID card confirmation in the identification procedure, and to a procedure for checking authenticity (i.e., validity) of an ID card using ID card information obtained by imaging an ID card by a user terminal.

As an embodiment, a mobile application 900 is an application program (or application software) that is installed and driven in the user terminal 10 and implemented to operate in conjunction with the service providing server 30 or the certification agency server 20. As described above, the mobile application 900 may be a financial application.

A method for recognizing an ID card of the user terminal 10 using deep learning will be described with reference to FIG. 2.

Figure 2:
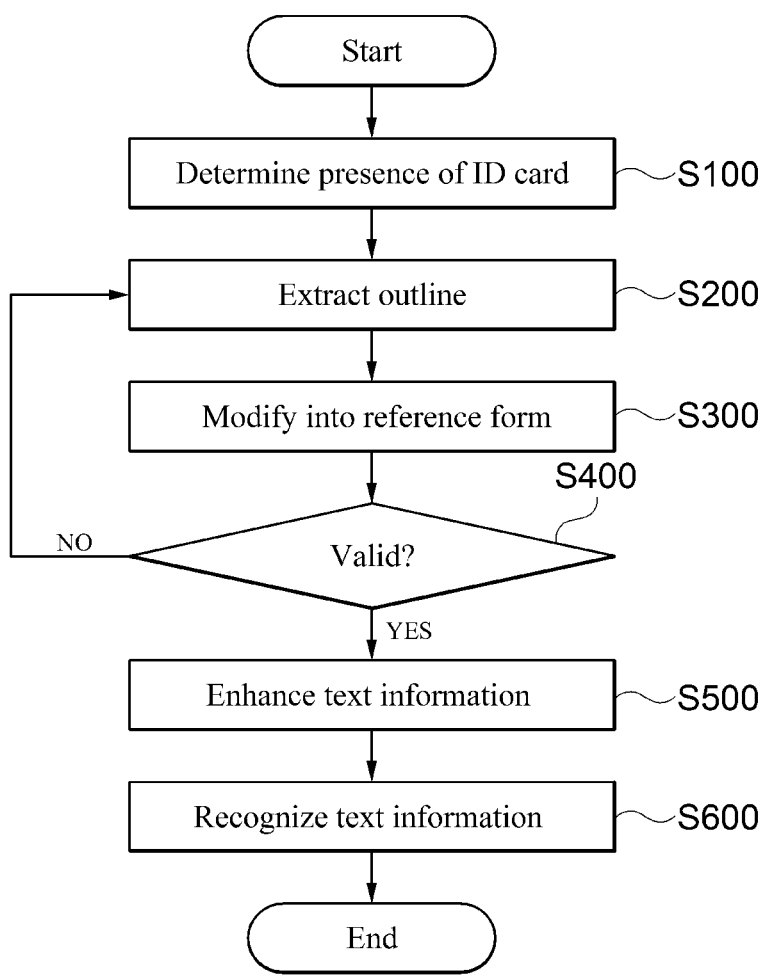
FIG. 2 is a flowchart illustrating a method for recognizing an ID card of a user terminal using deep learning according to an embodiment of the present disclosure.

FIG. 2 is a flowchart illustrating a method for recognizing an ID card of a user terminal through a deep learning-based ID card recognition model according to an embodiment of the present disclosure.

In the present embodiment, the ID card recognition model may be included in the financial application and installed in the user terminal 10, and the user may perform ID card recognition using the financial application.

The ID card recognition model is an algorithm or program that learns an ID card recognition process through input data, and is also called a deep neural network. The ID card recognition model may include a single or a plurality of neural network models, and may output a prediction value from input data according to a pre-trained result. Specifically, in the present embodiment, the ID card recognition model may output identity information of the user in the ID card from the image input through the user terminal 10, and includes a first neural network model and a second neural network model.

Referring to FIG. 2, the user terminal 10 may determine whether there is an ID card in an input image using a second neural network model (the first neural network model is a model trained to determine an outer region of the ID card image, which is described below in the step (S200) of extracting an outline) (S100).

The image input to the second neural network model may be directly captured and input through the camera module of the user terminal 10, and, in some cases, may be an image received from an external device through a remote network.

In the present embodiment, a convolutional neural network (CNN) algorithm may be applied to the second neural network model. The second neural network model may include at least one layer that performs convolution on an input image, and each layer may perform a convolution operation on pixel values by applying filters having various sizes.

A result of performing the convolution operation may be finally output as a designed result such as the existence of an object, a position of the object, a type of the object, etc. through a fully-connected layer, and in the present embodiment, the second neural network model may determine whether an ID card exists in the input image as a binary value according to a result of binary classification and provide the binary value.

In the step (S100) of determining of whether an ID card exists, when it is determined that an ID card does not exist in the input image, information requesting the user to image an ID card may be continuously provided on a display module, while maintaining the operation of the camera module in the user terminal 10. Alternatively, since it may be determined that the ID card does not exist even though the user recognizes the ID in the camera module, information requesting to move to an environment in which external lighting or the existence of the ID may be confirmed.

Meanwhile, if the ID card exists in the input image in the step (S100) of determining of whether an ID card exists (S100), the user terminal 10 may extract an outline region of the ID card included in the input image using the first neural network model (S200).

The first neural network model may perform image analysis steps including an ID card outline extraction step using regression analysis, an ID card image warping step, and an inhibitory factor determination step.

The CNN algorithm may be applied to the first neural network model, and specifically, the first neural network model may extract an outline region of the ID card in the image through regression analysis.

Regression analysis is a method of deriving a target pixel by repeatedly reducing a region of a candidate pixel in an image continuously in order to track a position of a specific pixel in the image. As described above, the first neural network model repeatedly calculates feature values of the image through a plurality of layers and derives a position of a target pixel.

The first neural network model may derive at least one corner position of the ID card image as a result of the regression analysis and label the derived corner position in the image.

In the step (S200) of extracting an outline region, an outline of the ID card image may be extracted based on the position of the corner derived through the first neural network model. Preferably, since the ID card generally has a rectangular shape with four corners, the outline region may be extracted by connecting the four corners in a straight line.

After the outline region is extracted, the user terminal 10 may modify the ID card image in the image into a reference form using at least a partial value of the extracted outline region (S300). For example, ID card image warping may be performed so that the ID card may be placed at the same position all the time using corner coordinates of the ID card.

For accurate recognition of identity information in the ID card image, in the present embodiment, the ID card image is converted into a reference form, and information on a position defined in the reference form may be recognized as identity information according to each category.

In general, the ID card has a predetermined size and ratio, and since identity information is written in the specified position and area, in the step (S300) of modifying into the reference form, the input ID card image may be modified into the reference form based thereon.

That is, in the step (S300) of modifying into a reference form, even if the ID card image exists in the image input with various sizes and ratios according to an image capture angle and an imaging distance, the ID card image is reconfigured to have a ratio and a size of an ID card in the reference form using the extracted outline region.

For example, in the step (S300) of modifying into a reference form, the ID card image may be modified into the reference form using at least a partial value of the extracted outline region so that positions of identity information in the imaged ID card are mapped to a reference position.

In the present embodiment, the reference form may be information that defines the size of each ID card and the position of information in the ID card input by the user in advance, or may be a form of an ID card obtained in a learning process of the user terminal 10.

As a further embodiment, the first neural network model may use data augmentation for learning.

The first neural network model may perform learning through augmentation data assuming various image capture conditions of the ID card image. Here, the image capture condition is a variable affecting a result of capturing an image of the ID card and may define conditions for augmenting collected images of the ID card.

In an embodiment, the ID card image may show various aspects due to factors such as position shift, rotation, brightness change, and blur in the captured image as the image capture condition, and thus, data may be augmented in consideration of the various factors.

Since prediction performance of the neural network model varies depending on the quantity and quality of learning data, in the present embodiment, the learning data may be augmented by changing the data assuming various image capture conditions.

Hereinafter, a data augmentation method according to the present embodiment will be described in more detail.

In the present embodiment, the coordinates (X, Y) of the four corners of the ID card image collected for data augmentation may be used.

When the coordinates of the corners are labeled on the ID card image, learning data may be augmented by predicting a modification shape of the ID card image according to shift, rotation, brightness, blur, etc. as image capture conditions based on the corresponding coordinates.

In the present embodiment, learning may be performed by a supervised learning method. Based on the coordinate values of the labeled corners for a pre-augmentation image, a new position in the image that is modified according to the augmentation condition is calculated.

Next, the calculated corner position may be labeled as corner coordinates of the ID card in the image generated by augmentation.

Thereafter, learning may be performed by providing the image generated through augmentation as learning data to the first neural network model and updating the first neural network model by comparing the output corner coordinates with the labeled corner coordinates.

As described above, a plurality of learning data may be generated by converting one ID card image according to a predetermined condition, and the first neural network model may perform learning through the generated data.

According to the present disclosure described above, the first neural network model may predict conditions that the user may experience in a situation in which the user actually captures an image an ID card and uses data generated according to the conditions for learning, and thus, the first neural network model may respond to various image capture conditions, and thus more accurately extract the outline region of the ID card.

Next, it may be determined whether the modified ID card image is valid (S400).

In the step (S400) of determining whether the ID card image is valid, it may be determined whether an additional step for recognizing identity information is to be performed by checking whether there is a recognition inhibitory factor in the image using the third neural network model.

Here, the third neural network model may be implemented based on a CNN algorithm, and may output a result of tracking and classifying recognition inhibitory factors in an input image.

In the present embodiment, the inhibitory factor refers to a factor that interferes with recognition of the ID card, and may include light reflection, a hologram of the ID card, and a shadow due to an external object.

Therefore, whether there is an inhibitory factor in the input ID card image may be detected by using the third neural network model trained to detect the inhibitory factor, and the validity of the ID card image may be determined according to a detection result.

As a result of the determination, if a recognition inhibitory factor is included in the modified image, each step for recognizing the ID card may be performed again.

That is, when the modified image includes a recognition inhibitory factor, the user terminal 10 may perform the step (S200) of extracting the outline again. In terms of the user interface, the step (S200) of extracting the outline from the background is performed again in a state in which a screen for capturing an image of the ID card is maintained as it is, and thereafter, the step (S300) of modifying into a reference form and the step (S400) of determining whether the ID card image is valid may be performed.

Conversely, if it is determined that a recognition inhibitory factor is not included in the modified image, an additional step for ID card recognition may be performed.

In addition, the step (S400) of determining the validity described above may be performed not only for the purpose of recognizing the ID card in the ID card image but also for the purpose of informing that the capturing an image of the valid ID is completed in terms of the user interface.

In general, the user takes actions such as consciously minimizing movement and focusing the camera module on the ID card to capture an image of the ID card. Therefore, if the ID card image is valid, the determination result may be used so that the image capturing has been validly completed through the user interface and the user may stop image capturing, for user convenience.

As an additional embodiment, the third neural network model may also be pre-trained by collecting an ID card image including a recognition inhibitory factor as training data. Like the training of the second neural network model described above, the third neural network model may be trained using learning data that is augmented using a recognition inhibitory factor. Through this, the third neural network model may learn how to determine the presence of various recognition inhibitory factors, and may more accurately and quickly determine whether the ID card image is valid.

Next, in the step (S500) of reinforcing text information, a process of pre-processing a modified image may be performed in order to increase a recognition rate of text information as ID card information in the ID card image.

For example, the user terminal 10 may perform image processing so that a boundary line of text becomes clearer compared to a background by enhancing an outer pixel value of the text information in the modified image compared to periphery information. In this case, the step (S500) of enhancing may be performed in consideration of a size of the text and spacing between texts.

Subsequently, the user terminal 10 may recognize text information in the ID card image using the fourth neural network model in the modified image that has undergone the pre-processing (S600).

In the step (S600) of recognizing text information, a position of the text information in the ID card image may be detected using the enhanced pixel value, and then information of the corresponding text may be more easily recognized. In this case, it is also possible to extract and selectively recognize only text information necessary for checking an ID card using a position for each item prescribed in advance for the ID card among various text information.

Hereinafter, a structure of the entire ID card recognition model including a plurality of neural network models for ID card recognition will be described with reference to FIG. 3.

The ID card recognition model according to the present disclosure may be configured by organically combining a deep learning-based neural network model trained for each step, instead of a single neural network model.

That is, an output of a neural network model of a previous stage may be used as an input of a neural network model of a next stage, or whether to perform a next stage may be determined according to an output value.

Figure 3:
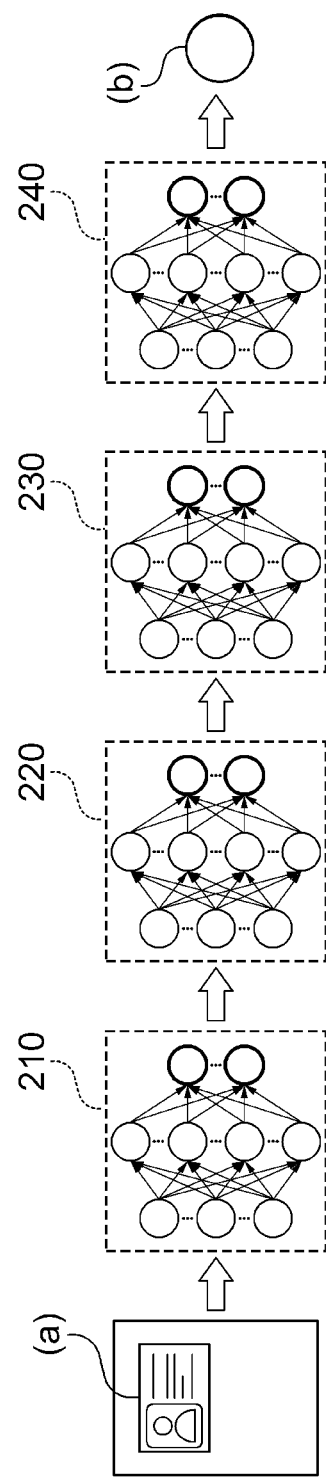
FIG. 3 is an exemplary view showing an ID card recognition model using deep learning according to an embodiment of the present disclosure.

Referring to FIG. 3, when an image is input, the user terminal 10 may determine whether an ID card (a) is present in the input image using a second neural network model 210.

Subsequently, the user terminal 10 may extract an outline region of the ID card (a) included in the input image using a first neural network model 220.

Here, the first neural network model 220 and the second neural network model 210 may use a captured image as common input data. However, since it is determined whether to perform the first neural network model 220 according to an output value from the second neural network model 210, the two neural network models may be sequentially performed according to the output value.

Next, the user terminal 10 may determine whether a recognition inhibitory factor is present in a modified image using a third neural network model 230.

The third neural network model 230 may use the modified image as an input by using an outline extraction result of the first neural network model 220.

The third neural network model 230 may output a result of determining validity of the input image as an output value.

By inputting a valid ID card image according to the output value, the fourth neural network model 240 may recognize text information in the image and output text information (b).

The user terminal 10 may transmit the text information of the recognized ID card to the certification agency server 20 using the sequential determination results of the plurality of neural network models to request a determination of authenticity of the ID card.

Additionally, although not shown, in the present embodiment, the user terminal 10 may request the user to confirm the recognized information before transmitting the recognized text information, and may modify the recognized information by reflecting a correction from the user.

In addition, the user's correction may be transmitted to the plurality of neural network models used for recognition and may be used for training of the neural network models.

The method for recognizing an ID card according to the present embodiment performs ID card recognition using an independently trained neural network model in each step for ID card recognition, so that the ID card may be analyzed and text information may be detected within a shorter time than the image processing of the related art.

In addition, the user terminal 10 receives feedback from the user and propagates the ID card recognition result back to the neural network models to re-learn, so that the neural network models may adapt themselves to various image capture environments and increase a recognition rate and recognition speed of the neural network models.

Hereinafter, the method for recognizing an ID card (or an ID card recognition method) described above will be described in terms of the process of the user terminal 10 with reference to FIG. 4. The ID card recognition method of the user terminal 10 according to an embodiment of the present disclosure may be divided into a first process 10-1 and a second process 10-2 to be performed.

Figure 4:
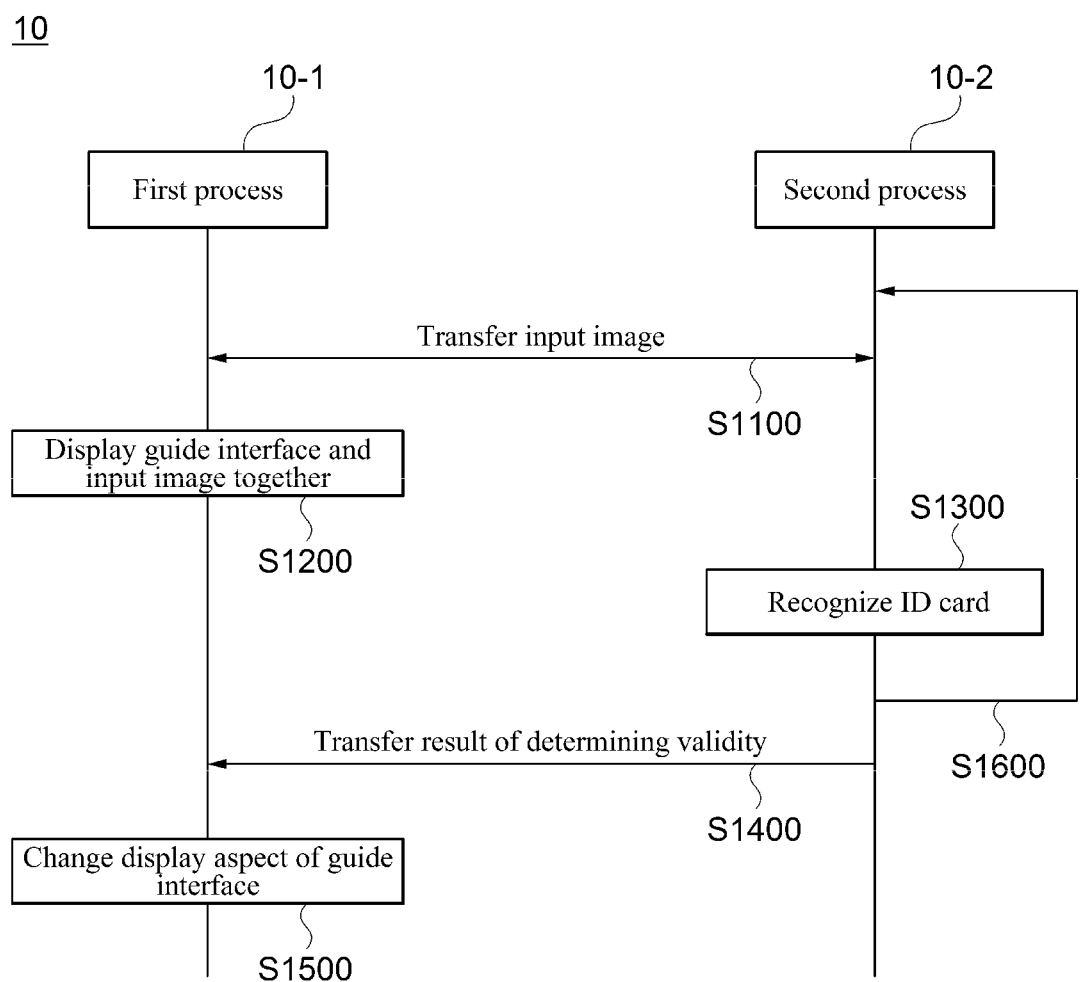
FIG. 4 is a timing diagram showing a method for recognizing an ID card using deep learning according to an embodiment of the present disclosure.

Referring to FIG. 4, the ID card recognition method of the user terminal 10 may be divided into a plurality of processes in the user terminal 10 and performed in parallel.

The first process 10-1 may induce a user to capture an image of an ID by providing a user interface, and provide an ID card recognition process according to the capturing of the image of the ID through a display module.

The second process 10-2 may perform a sequential process of determining the existence of an ID card in the input image and the possibility of recognizing the identity information in real time and recognizing identity information in the background.

First, the user terminal 10 may receive an image and transfer the input image to each of the processes 10-1 and 10-2 (S1100).

That is, the second process 10-2 may receive the transferred image for recognition of identity information, and at the same time, the first process 10-1 of the user terminal may also receive the transferred image and display the input image through the module (S1200).

In more detail, the user terminal 10 may display a guide interface for guiding an image capture region of the ID card in the first process 10-1 and the received image together (S1200). The guide interface may be displayed in an overlapping manner on the image being captured in real time and a user's motion may be induced to position an ID card portion in the guide interface.

Figure 5:
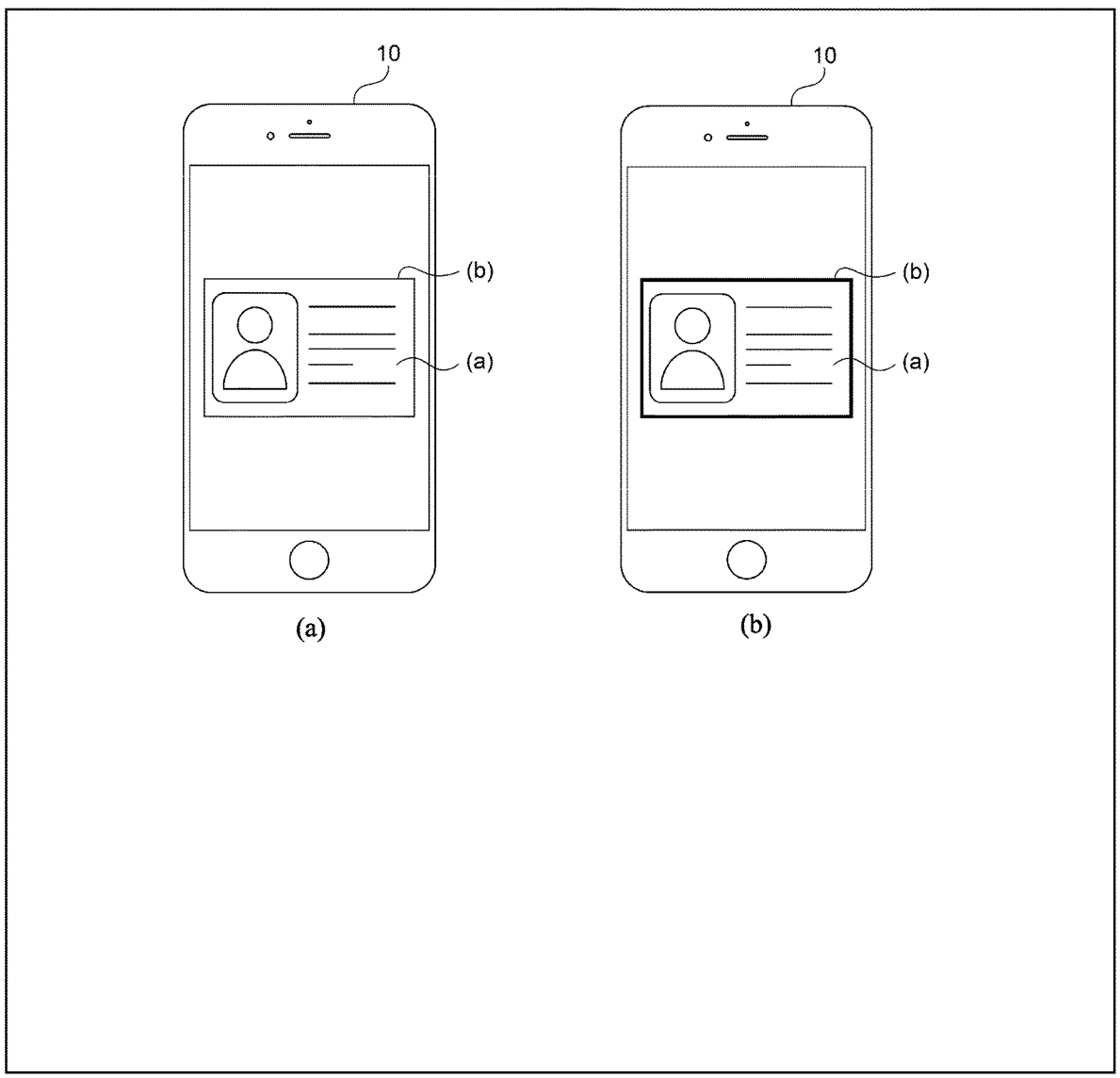
FIG. 5 is an exemplary diagram illustrating a user terminal according to an embodiment of the present disclosure.

Referring to FIG. 5, in the most preferred form, image capturing may be induced so that an outline of the ID card (a) and the guide interface (b) for guiding the image capture region match each other as much as possible on the display module of the user terminal 10.

As an embodiment, the user terminal 10 may perform a first process 10-1 for guiding the user to properly capture an image of an ID card through the display module and a second process 10-2 for recognizing the ID card in an image frame that is performed in the background and captured in real time.

The first process 10-1 and second process 10-2 described above are arbitrarily divided for the purpose of explaining the operation of the application on the user terminal 10, and each process is not limited to an operation on mutually different processors and may be performed by a single processor (e.g., a multi-processor) supporting multi-tasking according to an implementation method of the user terminal.

The second process 10-2 is a step (S1300) of recognizing an ID card, and may sequentially perform the ID card recognition method according to FIG. 3 described above.

Specifically, the step (S1300) of recognizing an ID card may perform the step (S100) of determining the existence of an ID card, the step (S200) of extracting an outline, and the step (S400) of determining validity, and transfer a result of determining validity to the first process 10-1 (S1400).

That is, when the ID card in the image frame input in real time is valid enough to be recognized, a corresponding result may be transmitted to the first process 10-1 (S1400), so that the user may release a concentration state for image capturing and promote user convenience.

The first process 10-1 may change a display aspect of the guide interface (guide box, line, etc.) according to the result of determining validity received in the second process 10-2 (S1500).

Referring to FIGS. 5A and 5B, the user terminal 10 may change a thickness or color of the guide interface (b) of FIG. 5A into a shape as shown in FIG. 5B or change a displayed shape according to the received determination result. Through this, the user may intuitively determine whether the captured image is valid.

Meanwhile, in the step (S1300) of recognizing the ID card, if the image is not recognized due to an external inhibitory factor as a result of the step (S400) of determining validity, no information is transmitted to the first process 10-1 and the user may be allowed to continue capturing an image of the ID card (S1600).

Accordingly, the step (S1300) of recognizing an ID card may be repeatedly performed on the continuously input image.

After the image capturing is effectively performed through the above process, the second process 10-2 may perform step (S500) of enhancing text information of the ID card recognition method according to FIG. 3 described above and step (S600) of recognizing text information.

Hereinafter, an application stored in the user terminal 10 that provides an ID card recognition method using deep learning will be described with reference to FIG. 6.

Figure 6:
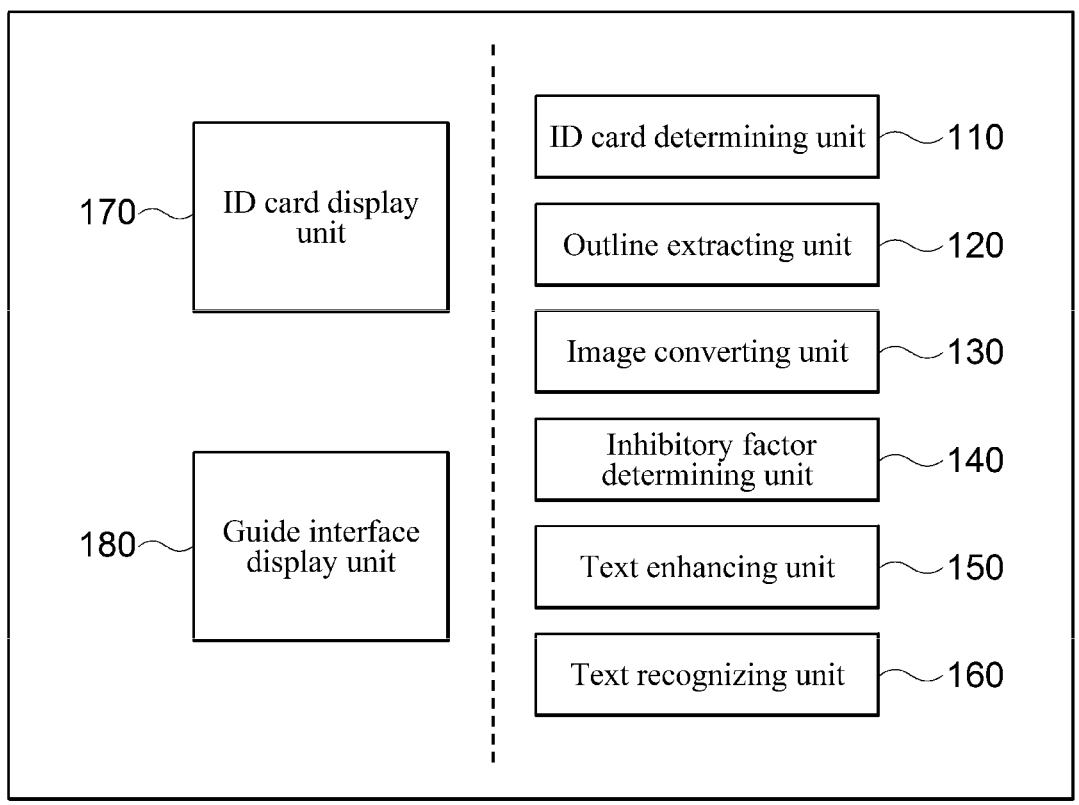
FIG. 6 is a block diagram illustrating a mobile application according to an embodiment of the present disclosure.

FIG. 6 is a block diagram illustrating a configuration of an application stored in the user terminal 10 according to an embodiment of the present disclosure.

Referring to FIG. 6, an application stored in the user terminal 10 may include an ID card display unit 170 and a guide interface display unit 180 that perform the first process 10-1 according to FIG. 4.

In addition, the application may include an ID card determining unit 110, an outline extracting unit 120, an image modifying unit 130, an inhibitory factor determining unit 140, a text enhancing unit 150, and a text recognizing unit 160 that perform the second process 10-2.

In the present embodiment, the application may include sub-modules that perform the intended step of the process using resources of the user terminal 10, and an operation of each module will be described below.

First, the ID card display unit 170 of the first process 10-1 may receive an imaged ID card from the camera device of the user terminal 10, and display the ID card image through the display device.

Through this, the user of the user terminal 10 may recognize the ID card to be imaged in real time and check the contents thereof.

The guide interface display unit 180 may display a guide interface for guiding an image capture region of the ID card together with the ID card image. By displaying the guide interface in an overlapping manner on the image being captured in real time, a user's action may be induced to position the displayed ID card in a region within the guide interface.

At the same time, the ID card determining unit 110 of the second process 10-2 may determine whether an ID card exists in the input image using the second neural network model. Specifically, the ID card determining unit may use a second neural network model implemented by a convolution neural network (CNN).

The ID card determining unit 110 may output a binary classification result of the input image using the second neural network model to which the CNN is applied. Whether an ID card is present in the input image may be determined.

The outline extracting unit 120 may extract an outline region of the ID card included in the input image using the first neural network model. Specifically, the outline extracting unit may extract the corner of the ID card in the image through a regression analysis.

The outline extracting unit 120 may label at least one corner position of the extracted ID card image using the first neural network model, and extract an outline region of the ID card based on the corner position.

Additionally, the user terminal 10 according to the present embodiment may convert the ID card image in which the corner position is labeled by the outline extracting unit 120, according to a predetermined image capture condition to generate learning data, and use the generated learning data for learning.

The image modifying unit 130 may modify the ID card image in the image into a reference form by using at least a partial value of the outline region extracted by the outline extracting unit 120.

Specifically, the image modifying unit 130 may modify the ID card image in the captured image by using at least the partial value of the extracted outline region so that the ID card image may correspond to the reference form for text recognition.

By modifying the ID card image into the reference form, a recognition speed of text information in the ID card existing in a prescribed position and size may be increased.

Subsequently, the inhibitory factor determining unit 140 may determine whether the ID card image modified by the image modifying unit 130 is valid. Specifically, the inhibitory factor determining unit 140 may determine whether a recognition inhibitory factor is present in the modified image by using the third neural network model in the modified image.

Here, the third neural network model may detect and classify an inhibitory factor in the image. Specifically, the third neural network model may generate the presence, size, etc. of an inhibitory factor in the input ID card image as an output, and may determine validity thereof by comparing it with a reference value.

At this time, if the ID card image is valid, the second process 10-2 transfers a determination result value indicating the ID card image is valid to the first process 10-1, and the guide interface display unit 180 may change and display a display aspect of a guide interface (guide box, line, etc.), thereby guiding the user that capturing an image of the ID card has been normally completed.

Thereafter, when the inhibitory factor determining unit 140 determines that the ID card image is valid, the text enhancing unit 150 may enhance the outer pixel values of the text information in the modified image against the periphery information. That is, a pre-processing process for recognizing text in the ID card image may be additionally performed.

Thereafter, the text recognizing unit 160 may recognize text information in the ID card image using the fourth neural network model. Specifically, the text recognizing unit 160 may detect a position of the text information in the ID card image by using the enhanced pixel value, and then recognize the text information.

Figure 7:
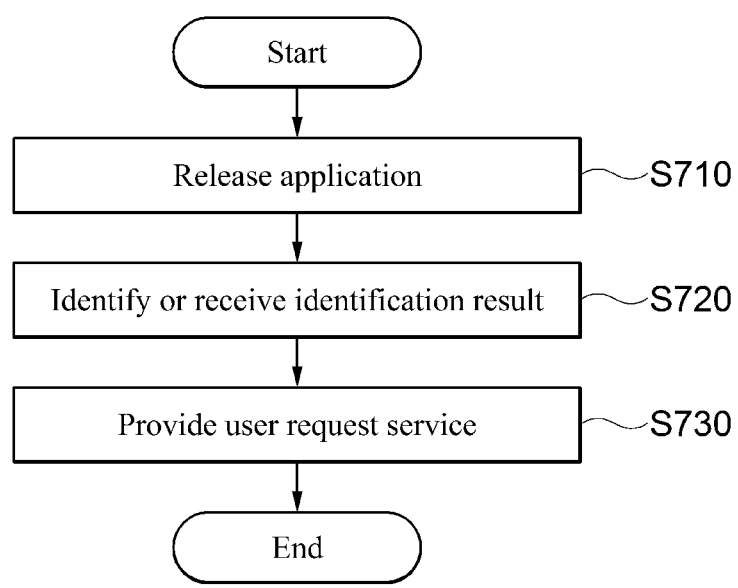
FIG. 7 is a flowchart illustrating an ID card recognizing method of a service providing server using deep learning according to an embodiment of the present disclosure.

Hereinafter, an operation of a server that provides a service using an ID card recognition method based on deep learning according to the embodiment described above will be described with reference to FIG. 7.

First, the service providing server 30 may release an application including an ID card recognition model that performs at least one convolution operation on an ID card image captured by the user terminal 10 so that the user terminal may use the application (S710).

The service providing server 30 may release the developed ID card recognition model and train the ID card recognition model using a result of using the released ID card recognition model. Specifically, the service providing server 30 may develop and manage a model for recognizing the user's identity information through an ID card image, and release it to the user terminal so that the user may more conveniently perform tasks using various ID cards.

For example, the service providing server 30 is a server operated directly or indirectly in a financial institution, and may release applications to provide tasks such as identification using an ID card required for Internet banking services, account opening, etc. An ID card recognition model that recognizes an ID card may be included in the applications.

The service providing server 30 may check authenticity of the user's ID card according to an ID card recognition result of the released ID card recognition model or receive a result of checking authenticity of the ID card (S720).

That is, the user may download and install a banking application released by the service providing server 30 from an application store or the like using the user terminal 10, for example, a smartphone, and use services such as Internet banking, etc., and for tasks requiring identification, the user may capture an ID card through the camera module.

As an embodiment, the user terminal 10 requests the certification agency server 20 to check the authenticity of the ID card using the ID card information recognized through the imaged ID card, and after receiving a checking result, the user terminal 10 may provide the result to the service providing server 30. As another embodiment, the service providing server 30 may transmit a request for checking authenticity to the certification agency server 20 using the identity information received from the user terminal 10, and receive corresponding result information.

Next, the service providing server 30 may provide a user requested service according to the result of checking the ID card (S730).

That is, the service providing server 30 may provide an additional process for account opening, event participation, and other banking tasks according to the result of checking the authenticity of the ID card using the identity information recognized by the deep learning-based application from the user terminal 10.

As described above, according to the present disclosure, there is an effect of increasing a text information recognition rate of an ID card by modifying an ID card image into a reference form using a trained neural network model.

In addition, the present disclosure has an effect of more accurately extracting an outline region, which is the basis of ID card recognition, through learning data considering various image capture environments.

In addition, the present disclosure has the effect of more accurately and quickly determining the validity of an ID card image captured in real time by learning various ID card recognition inhibitory factors.

The terms "first," "second," "third," "fourth," and the like in the description and in the claims, are used for distinguishing between similar elements and not necessarily for describing a particular sequential or chronological order. It is to be understood that the terms are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Various embodiments described herein may be implemented in, for example, a computer-readable recording medium or similar devices using software, hardware, or a combination thereof.

According to a hardware implementation, the exemplary embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions. In some cases, the exemplary embodiments described in the present specification may be implemented by a control module itself.

According to a software implementation, the exemplary embodiments such as procedures and functions described in the present specification may be implemented as separate software modules. Each of the software modules may perform one or more functions and operations described in the present specification. Software code may be implemented in software applications written in a suitable programming language. The software code may be stored in a memory module and may be executed by the control module.

The above description is merely illustrative of the technical idea of the present disclosure, and various modifications, changes, and substitutions may be made by those skilled in the art without departing from the essential characteristics of the present disclosure.

Accordingly, the exemplary embodiments disclosed in the present disclosure and the accompanying drawings are not intended to limit the technical idea of the present disclosure but to describe the present disclosure, and the scope of the technical idea of the present disclosure is not limited by the exemplary embodiments and the accompanying drawings. The protection scope of the present disclosure should be interpreted by the following claims, and all technical ideas within the equivalent scope should be interpreted as being included in the scope of the present disclosure.

The invention claimed is:

1. A method for recognizing an identification (ID) card of a user terminal using deep learning, the method comprising:
   extracting an outline region of the ID card included in an input image using a first neural network model;
   modifying an ID card image of the image to a reference form using at least a partial value of the extracted outline region; and
   determining whether the modified ID card image is valid according to the presence of a recognition inhibitory factor in the modified ID card image using a third neural network model and recognizing text information in the valid ID card image,
   wherein the extracting the outline region of the ID card comprises re-extracting the outline region of the ID card in a re-input image when the recognition inhibitory factor is present.

2. The method of claim 1, further comprising:
   determining whether the ID card exists in the input image using a second neural network model,
   wherein the extracting the outline region of the ID card comprises extracting the outline region when the ID card exists.

3. The method of claim 2, further comprising:
   enhancing an outer pixel value of the text information in the modified ID card image against periphery information,
   wherein the recognizing the text information comprises recognizing the text information in the ID card image using the enhanced pixel value.

4. The method of claim 1, wherein,
   wherein the recognizing the text information comprises recognizing the text information in the ID card image using a fourth neural network model.

5. The method of claim 1, wherein
   the first neural network model configured to label at least one corner position of the ID card image, and perform learning through data generated by converting the labeled ID card image according to a predetermined condition.

6. The method of claim 1, wherein
   the third neural network model configured to perform learning by collecting the ID card image including the recognition inhibitory factor as learning data.

7. An apparatus for recognizing an identification (ID) card based on deep learning, the apparatus comprising:
   at least one processor; and
   a non-transitory computer-readable medium storing instructions that when executed by the at least one processor causes the at least one processor to perform operations including:
   extracting an outline region of the ID card included in an input image using a first neural network model;
   modifying an ID card image of the image to a reference form using at least a partial value of the extracted outline region;
   determining whether the modified ID card image is valid according to the presence of a recognition inhibitory factor in the modified ID card image using a third neural network model; and
   recognizing text information in the valid ID card image,
   wherein the extracting the outline region of the ID card comprises re-extracting the outline region of the ID card in a re-input image when the inhibitory factor determining unit determines the modified ID card is invalid according to the presence of the recognition inhibitory factor.

8. The apparatus of claim 7, further comprising:
   determining whether the ID card exists in the input image using a second neural network model,
   wherein the extracting the outline region of the ID card comprises extracting the outline region when the ID card exists.

9. The apparatus of claim 8, further comprising:
   enhancing an outer pixel value of the text information in the modified ID card image against periphery information,
   wherein the determining whether the ID card exists in the input image using the second neural network model comprises recognizing the text information in the ID card image using the enhanced pixel value.

10. The apparatus of claim 7,
    wherein the recognizing the text information comprises recognizing the text information in the ID card image using a fourth neural network model.

11. A method of providing an identification (ID) card recognition service based on deep learning performed in a service providing server, the method comprising:
    releasing an application including an ID card recognition model performing at least one convolution operation so that a user terminal uses the application for an image captured by the user terminal;
    receiving a result of checking authenticity of an ID card through a certification agency server from the user terminal according to an ID card recognition result of the released ID card recognition model; and
    providing a user request service according to the result of checking authenticity of the ID card,
    wherein the ID card recognition model comprising:
    extracting an outline region of the ID card included in an input image using a first neural network model;
    modifying an ID card image of the image to a reference form using at least a partial value of the extracted outline region; and
    determining whether the modified ID card image is valid according to the presence of a recognition inhibitory factor in the modified ID card image using a third neural network model,
    wherein the extracting the outline region of the ID card comprises re-extracting the outline region of the ID card in a re-input image captured by the user terminal when the recognition inhibitory factor is present.

12. The method of claim 11, wherein
    the ID card recognition model configured to determine whether the ID card exists in the input image using a second neural network model and extract the outline region using the first neural network model when the ID card exists.

13. The method of claim 11, wherein
    the ID card recognition model configured to enhance an outer pixel value of the text information in the modified ID card image against periphery information and recognize text information in the ID card image using the enhanced pixel value.

14. The method of claim 11, wherein
the ID card recognition model configured to recognize text information in the ID card image using a fourth neural network model.

\* \* \* \* \*